United States Patent
Lesso

(10) Patent No.: US 10,839,808 B2
(45) Date of Patent: Nov. 17, 2020

(54) DETECTION OF REPLAY ATTACK

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 119 days.

(21) Appl. No.: 16/155,201

(22) Filed: Oct. 9, 2018

(65) Prior Publication Data

US 2019/0115030 A1 Apr. 18, 2019

Related U.S. Application Data

(60) Provisional application No. 62/571,959, filed on Oct. 13, 2017.

(30) Foreign Application Priority Data

Mar. 6, 2018 (GB) .................................. 1803570.9

(51) Int. Cl.
G10L 17/02 (2013.01)
G10L 17/04 (2013.01)
(Continued)

(52) U.S. Cl.
CPC ................ G10L 17/02 (2013.01); G01S 5/18 (2013.01); G10L 17/00 (2013.01); G10L 17/04 (2013.01);
(Continued)

(58) Field of Classification Search
USPC ....... 704/246, 249, 250, 200, 205, 206, 500, 704/502
See application file for complete search history.

(56) References Cited

U.S. PATENT DOCUMENTS 5,197,113 A 3/1993 Mumolo
5,568,559 A 10/1996 Makino
(Continued)

FOREIGN PATENT DOCUMENTS

AU 2015202397 B2 5/2015
CN 1937955 A 3/2007
(Continued)

OTHER PUBLICATIONS

International Search Report and Written Opinion of the International Searching Authority, International Application No. PCT/GB2018/053274, dated Jan. 24, 2019.
(Continued)

*Primary Examiner* — Qi Han
(74) *Attorney, Agent, or Firm* — Jackson Walker L.L.P.

(57) ABSTRACT

In order to detect a replay attack on a voice biometrics system, a speech signal is received at at least a first microphone and a second microphone. The speech signal has components at first and second frequencies. The method of detection comprises: obtaining information about a position of a source of the first frequency component of the speech signal, relative to the first and second microphones; obtaining information about a position of a source of the second frequency component of the speech signal, relative to the first and second microphones; comparing the position of the source of the first frequency component and the position of the source of the second frequency component; and determining that the speech signal may result from a replay attack if the position of the source of the first frequency component differs from the position of the source of the second frequency component by more than a threshold amount.

12 Claims, 9 Drawing Sheets

(51) Int. Cl.

| | |
|---|---|
| *G10L 21/0308* | (2013.01) |
| *G10L 25/06* | (2013.01) |
| *H04R 3/00* | (2006.01) |
| *H04R 1/32* | (2006.01) |
| *G10L 21/0232* | (2013.01) |
| *G01S 5/18* | (2006.01) |
| *G10L 25/51* | (2013.01) |
| *G10L 17/00* | (2013.01) |
| *G10L 21/0216* | (2013.01) |

(52) U.S. Cl.
CPC ...... *G10L 21/0232* (2013.01); *G10L 21/0308* (2013.01); *G10L 25/06* (2013.01); *G10L 25/51* (2013.01); *H04R 1/326* (2013.01); *H04R 3/005* (2013.01); *G10L 2021/02165* (2013.01)

(56) References Cited

U.S. PATENT DOCUMENTS

| | | | |
|---|---|---|---|
| 5,787,187 | A | 7/1998 | Bouchard et al. |
| 6,480,825 | B1 | 11/2002 | Sharma et al. |
| 7,016,833 | B2 | 3/2006 | Gable et al. |
| 7,039,951 | B1 | 5/2006 | Chaudhari et al. |
| 7,492,913 | B2 | 2/2009 | Connor et al. |
| 8,489,399 | B2 | 7/2013 | Gross |
| 8,856,541 | B1 | 10/2014 | Chaudhury et al. |
| 8,997,191 | B1 | 3/2015 | Stark et al. |
| 9,049,983 | B1 | 6/2015 | Baldwin |
| 9,171,548 | B2 | 10/2015 | Velius et al. |
| 9,305,155 | B1 | 4/2016 | Vo et al. |
| 9,317,736 | B1 | 4/2016 | Siddiqui |
| 9,390,726 | B1 | 7/2016 | Smus et al. |
| 9,430,629 | B1 | 8/2016 | Ziraknejad et al. |
| 9,484,036 | B2 | 11/2016 | Kons et al. |
| 9,548,979 | B1 | 1/2017 | Johnson et al. |
| 9,641,585 | B2 | 5/2017 | Kvaal et al. |
| 9,646,261 | B2 | 5/2017 | Agrafioti et al. |
| 9,659,562 | B2 | 5/2017 | Lovitt |
| 9,665,784 | B2 | 5/2017 | Derakhshani et al. |
| 9,984,314 | B2 | 5/2018 | Philipose et al. |
| 10,032,451 | B1 | 7/2018 | Mamkina et al. |
| 10,063,542 | B1 | 8/2018 | Kao |
| 10,079,024 | B1* | 9/2018 | Bhimanaik ............ G10L 17/06 |
| 10,097,914 | B2 | 10/2018 | Petrank |
| 10,192,553 | B1 | 1/2019 | Chenier et al. |
| 10,204,625 | B2 | 2/2019 | Mishra et al. |
| 10,210,685 | B2 | 2/2019 | Borgmeyer |
| 10,305,895 | B2 | 5/2019 | Barry et al. |
| 10,318,580 | B2 | 6/2019 | Topchy et al. |
| 10,460,095 | B2 | 10/2019 | Boesen |
| 10,467,509 | B2 | 11/2019 | Albadawi et al. |
| 10,733,987 | B1 | 8/2020 | Govender et al. |
| 2002/0194003 | A1 | 12/2002 | Mozer |
| 2003/0033145 | A1 | 2/2003 | Petrushin |
| 2003/0177006 | A1 | 9/2003 | Ichikawa et al. |
| 2003/0177007 | A1 | 9/2003 | Kanazawa et al. |
| 2004/0030550 | A1 | 2/2004 | Liu et al. |
| 2004/0141418 | A1 | 7/2004 | Matsuo et al. |
| 2005/0060153 | A1 | 3/2005 | Gable et al. |
| 2005/0171774 | A1 | 8/2005 | Applebaum et al. |
| 2006/0171571 | A1 | 8/2006 | Chan et al. |
| 2007/0055517 | A1 | 3/2007 | Spector |
| 2007/0129941 | A1 | 6/2007 | Tavares |
| 2007/0185718 | A1 | 8/2007 | Di Mambro et al. |
| 2007/0233483 | A1 | 10/2007 | Kuppuswamy et al. |
| 2007/0250920 | A1 | 10/2007 | Lindsay |
| 2008/0071532 | A1 | 3/2008 | Ramakrishnan et al. |
| 2008/0082510 | A1 | 4/2008 | Wang et al. |
| 2008/0223646 | A1 | 9/2008 | White |
| 2008/0262382 | A1 | 10/2008 | Akkermans et al. |
| 2008/0285813 | A1 | 11/2008 | Holm |
| 2009/0087003 | A1 | 4/2009 | Zurek et al. |
| 2009/0105548 | A1 | 4/2009 | Bart |
| 2009/0167307 | A1 | 7/2009 | Kopp |
| 2009/0232361 | A1 | 9/2009 | Miller |
| 2009/0281809 | A1 | 11/2009 | Reuss |
| 2009/0319270 | A1 | 12/2009 | Gross |
| 2010/0004934 | A1 | 1/2010 | Hirose et al. |
| 2010/0076770 | A1 | 3/2010 | Ramaswamy |
| 2010/0204991 | A1 | 8/2010 | Ramakrishnan et al. |
| 2010/0328033 | A1 | 12/2010 | Kamei |
| 2011/0051907 | A1 | 3/2011 | Jaiswal et al. |
| 2011/0246198 | A1 | 10/2011 | Asenjo et al. |
| 2011/0276323 | A1 | 11/2011 | Seyfetdinov |
| 2011/0314530 | A1 | 12/2011 | Donaldson |
| 2011/0317848 | A1 | 12/2011 | Ivanov et al. |
| 2012/0110341 | A1 | 5/2012 | Beigi |
| 2012/0223130 | A1 | 9/2012 | Knopp et al. |
| 2012/0224456 | A1 | 9/2012 | Visser et al. |
| 2012/0249328 | A1 | 10/2012 | Xiong |
| 2012/0323796 | A1 | 12/2012 | Udani |
| 2013/0024191 | A1 | 1/2013 | Krutsch et al. |
| 2013/0058488 | A1 | 3/2013 | Cheng et al. |
| 2013/0080167 | A1 | 3/2013 | Mozer |
| 2013/0227678 | A1 | 8/2013 | Kang |
| 2013/0247082 | A1 | 9/2013 | Wang et al. |
| 2013/0279297 | A1 | 10/2013 | Wulff et al. |
| 2013/0279724 | A1 | 10/2013 | Stafford et al. |
| 2013/0289999 | A1 | 10/2013 | Hymel |
| 2014/0059347 | A1* | 2/2014 | Dougherty ............ H04W 12/06 713/168 |
| 2014/0149117 | A1 | 5/2014 | Bakish et al. |
| 2014/0188770 | A1 | 7/2014 | Agrafioti et al. |
| 2014/0237576 | A1 | 8/2014 | Zhang et al. |
| 2014/0241597 | A1 | 8/2014 | Leite |
| 2014/0293749 | A1 | 10/2014 | Gervaise |
| 2014/0307876 | A1 | 10/2014 | Agiomyrgiannakis et al. |
| 2014/0330568 | A1 | 11/2014 | Lewis et al. |
| 2014/0337945 | A1 | 11/2014 | Jia et al. |
| 2014/0343703 | A1 | 11/2014 | Topchy et al. |
| 2015/0006163 | A1 | 1/2015 | Liu et al. |
| 2015/0033305 | A1 | 1/2015 | Shear et al. |
| 2015/0036462 | A1 | 2/2015 | Calvarese |
| 2015/0088509 | A1 | 3/2015 | Gimenez et al. |
| 2015/0089616 | A1 | 3/2015 | Brezinski et al. |
| 2015/0112682 | A1 | 4/2015 | Rodriguez et al. |
| 2015/0134330 | A1 | 5/2015 | Baldwin et al. |
| 2015/0161370 | A1 | 6/2015 | North et al. |
| 2015/0161459 | A1 | 6/2015 | Boczek |
| 2015/0168996 | A1 | 6/2015 | Sharpe et al. |
| 2015/0245154 | A1 | 8/2015 | Dadu et al. |
| 2015/0261944 | A1 | 9/2015 | Hosom et al. |
| 2015/0301796 | A1 | 10/2015 | Visser et al. |
| 2015/0332665 | A1 | 11/2015 | Mishra et al. |
| 2015/0347734 | A1 | 12/2015 | Beigi |
| 2015/0356974 | A1 | 12/2015 | Tani et al. |
| 2015/0371639 | A1 | 12/2015 | Foerster et al. |
| 2016/0026781 | A1 | 1/2016 | Boczek |
| 2016/0086609 | A1 | 3/2016 | Yue et al. |
| 2016/0111112 | A1 | 4/2016 | Hayakawa |
| 2016/0125877 | A1 | 5/2016 | Foerster et al. |
| 2016/0147987 | A1 | 5/2016 | Jang et al. |
| 2016/0217321 | A1 | 7/2016 | Gottleib |
| 2016/0234204 | A1 | 8/2016 | Rishi et al. |
| 2016/0314790 | A1 | 10/2016 | Tsujikawa et al. |
| 2016/0330198 | A1 | 11/2016 | Stern et al. |
| 2016/0371555 | A1 | 12/2016 | Derakhshani |
| 2017/0011406 | A1 | 1/2017 | Tunnell et al. |
| 2017/0049335 | A1 | 2/2017 | Duddy |
| 2017/0068805 | A1 | 3/2017 | Chandrasekharan |
| 2017/0078780 | A1 | 3/2017 | Qian et al. |
| 2017/0110121 | A1 | 4/2017 | Warlord et al. |
| 2017/0112671 | A1 | 4/2017 | Goldstein |
| 2017/0116995 | A1 | 4/2017 | Ady et al. |
| 2017/0161482 | A1 | 6/2017 | Eltoft et al. |
| 2017/0169828 | A1 | 6/2017 | Sachdev |
| 2017/0200451 | A1 | 7/2017 | Booklet et al. |
| 2017/0213268 | A1 | 7/2017 | Puehse et al. |
| 2017/0214687 | A1 | 7/2017 | Klein et al. |
| 2017/0231534 | A1 | 8/2017 | Agassy et al. |
| 2017/0279815 | A1 | 9/2017 | Chung et al. |
| 2017/0287490 | A1 | 10/2017 | Biswal et al. |
| 2017/0323644 | A1 | 11/2017 | Kawato |
| 2017/0347348 | A1 | 11/2017 | Masaki et al. |

(56) References Cited

U.S. PATENT DOCUMENTS

| | | |
|---|---|---|
| 2017/0351487 A1 | 12/2017 | Aviles-Casco Vaquero et al. |
| 2018/0018974 A1 | 1/2018 | Zass |
| 2018/0032712 A1 | 2/2018 | Oh et al. |
| 2018/0039769 A1 | 2/2018 | Saunders et al. |
| 2018/0047393 A1 | 2/2018 | Tian et al. |
| 2018/0060557 A1 | 3/2018 | Valenti et al. |
| 2018/0096120 A1 | 4/2018 | Boesen |
| 2018/0107866 A1 | 4/2018 | Li et al. |
| 2018/0108225 A1 | 4/2018 | Mappus et al. |
| 2018/0113673 A1 | 4/2018 | Sheynblat |
| 2018/0121161 A1 | 5/2018 | Ueno et al. |
| 2018/0146370 A1 | 5/2018 | Krishnaswamy et al. |
| 2018/0174600 A1 | 6/2018 | Chaudhuri et al. |
| 2018/0176215 A1 | 6/2018 | Perotti et al. |
| 2018/0187969 A1 | 7/2018 | Kim et al. |
| 2018/0191501 A1 | 7/2018 | Lindemann |
| 2018/0232201 A1 | 8/2018 | Holtmann |
| 2018/0232511 A1 | 8/2018 | Bakish |
| 2018/0239955 A1 | 8/2018 | Rodriguez et al. |
| 2018/0240463 A1 | 8/2018 | Perotti |
| 2018/0254046 A1 | 9/2018 | Khoury et al. |
| 2018/0289354 A1 | 10/2018 | Cvijanovic et al. |
| 2018/0292523 A1 | 10/2018 | Orenstein et al. |
| 2018/0308487 A1 | 10/2018 | Goel et al. |
| 2018/0336716 A1 | 11/2018 | Ramprashad et al. |
| 2018/0336901 A1 | 11/2018 | Masaki et al. |
| 2018/0366124 A1 | 12/2018 | Cilingir et al. |
| 2018/0374487 A1 | 12/2018 | Lesso |
| 2019/0005963 A1 | 1/2019 | Alonso et al. |
| 2019/0005964 A1 | 1/2019 | Alonso et al. |
| 2019/0013033 A1 | 1/2019 | Bhimanaik et al. |
| 2019/0030452 A1 | 1/2019 | Fassbender et al. |
| 2019/0042871 A1 | 2/2019 | Pogorelik |
| 2019/0098003 A1 | 3/2019 | Ota |
| 2019/0114496 A1 | 4/2019 | Lesso |
| 2019/0114497 A1 | 4/2019 | Lesso |
| 2019/0115030 A1 | 4/2019 | Lesso |
| 2019/0115032 A1 | 4/2019 | Lesso |
| 2019/0115033 A1 | 4/2019 | Lesso |
| 2019/0115046 A1 | 4/2019 | Lesso |
| 2019/0147888 A1 | 5/2019 | Lesso |
| 2019/0149932 A1 | 5/2019 | Lesso |
| 2019/0197755 A1 | 6/2019 | Vats |
| 2019/0199935 A1 | 6/2019 | Danielsen et al. |
| 2019/0228778 A1 | 7/2019 | Lesso |
| 2019/0228779 A1 | 7/2019 | Lesso |
| 2019/0246075 A1 | 8/2019 | Khadloya et al. |
| 2019/0260731 A1 | 8/2019 | Chandrasekharan et al. |
| 2019/0294629 A1 | 9/2019 | Wexler et al. |
| 2019/0306594 A1 | 10/2019 | Aumer et al. |
| 2019/0311722 A1 | 10/2019 | Caldwell |
| 2019/0313014 A1 | 10/2019 | Welbourne et al. |
| 2019/0318035 A1 | 10/2019 | Blanco et al. |
| 2019/0356588 A1 | 11/2019 | Shahraray et al. |
| 2019/0371330 A1 | 12/2019 | Lin et al. |
| 2019/0373438 A1 | 12/2019 | Amir et al. |
| 2019/0392145 A1 | 12/2019 | Komogortsev |
| 2019/0394195 A1 | 12/2019 | Chari et al. |
| 2020/0035247 A1 | 1/2020 | Boyadjiev et al. |

FOREIGN PATENT DOCUMENTS

| | | |
|---|---|---|
| CN | 104956715 A | 9/2015 |
| CN | 105185380 A | 12/2015 |
| CN | 106297772 A | 1/2017 |
| CN | 106531172 A | 3/2017 |
| EP | 1205884 A2 | 5/2002 |
| EP | 1600791 A1 | 11/2005 |
| EP | 1701587 A2 | 9/2006 |
| EP | 1928213 A1 | 6/2008 |
| EP | 1965331 A2 | 9/2008 |
| EP | 2660813 A1 | 11/2013 |
| EP | 2704052 A2 | 3/2014 |
| EP | 2860706 A2 | 4/2015 |
| EP | 3016314 A1 | 5/2016 |
| EP | 3156978 A1 | 4/2017 |
| GB | 2375205 A | 11/2002 |
| GB | 2493849 A | 2/2013 |
| GB | 2499781 A | 9/2013 |
| GB | 2515527 A | 12/2014 |
| GB | 2541466 A | 2/2017 |
| GB | 2551209 A | 12/2017 |
| JP | 2003058190 A | 2/2003 |
| JP | 2006010809 A | 1/2006 |
| JP | 2010086328 A | 4/2010 |
| WO | 9834216 A2 | 8/1998 |
| WO | 02/103680 A2 | 12/2002 |
| WO | 2006054205 A1 | 5/2006 |
| WO | 2007034371 A2 | 3/2007 |
| WO | 2008113024 A1 | 9/2008 |
| WO | 2010066269 A1 | 6/2010 |
| WO | 2013022930 A1 | 2/2013 |
| WO | 2013154790 A1 | 10/2013 |
| WO | 2014040124 A1 | 3/2014 |
| WO | 2015117674 A1 | 8/2015 |
| WO | 2015163774 A1 | 10/2015 |
| WO | 2016003299 A1 | 1/2016 |
| WO | 2017055551 A1 | 4/2017 |
| WO | 2017203484 A1 | 11/2017 |

OTHER PUBLICATIONS

Beigi, Homayoon, "Fundamentals of Speaker Recognition," Chapters 8-10, ISBN: 978-0-378-77592-0; 2011.

Li, Lantian et al., "A Study on Replay Attack and Anti-Spoofing for Automatic Speaker Verification", Interspeech 2017, Jan. 1, 2017, pp. 92-96.

Li, Zhi et al., "Compensation of Hysteresis Nonlinearity in Magnetostrictive Actuators with Inverse Multiplicative Structure for Preisach Model", IEE Transactions on Automation Science and Engineering, vol. 11, No. 2, Apr. 1, 2014, pp. 613-619.

Partial International Search Report of the International Searching Authority, International Application No. PCT/GB2018/052905, dated Jan. 25, 2019.

Combined Search and Examination Report, UKIPO, Application No. GB1713699.5, dated Feb. 21, 2018.

Combined Search and Examination Report, UKIPO, Application No. GB1713695.3, dated Feb. 19, 2018.

Zhang et al., An Investigation of Deep-Learing Frameworks for Speaker Verification Antispoofing—IEEE Journal of Selected Topics in Signal Processes, Jun. 1, 2017.

Combined Search and Examination Report under Sections 17 and 18(3), UKIPO, Application No. GB1809474.8, dated Jul. 23, 2018.

Wu et al., Anti-Spoofing for text-Independent Speaker Verification: An Initial Database, Comparison of Countermeasures, and Human Performance, IEEE/ACM Transactions on Audio, Speech, and Language Processing, Issue Date: Apr. 2016.

International Search Report and Written Opinion of the International Searching Authority, International Application No. PCT/GB2018/051760, dated Aug. 3, 2018.

International Search Report and Written Opinion of the International Searching Authority, International Application No. PCT/GB2018/051787, dated Aug. 16, 2018.

International Search Report and Written Opinion of the International Searching Authority, International Application No. PCT/GB2018/052907, dated Jan. 15, 2019.

Ajmera, et al., "Robust Speaker Change Detection," IEEE Signal Processing Letters, vol. 11, No. 8, pp. 649-651, Aug. 2004.

Combined Search and Examination Report under Sections 17 and 18(3), UKIPO, Application No. GB1719731.0, dated May 16, 2018.

Further Search Report under Sections 17 (6), UKIPO, Application No. GB1719731.0, dated Nov. 26, 2018.

Combined Search and Examination Report under Sections 17 and 18(3), UKIPO, Application No. GB1801663.4, dated Jul. 18, 2018.

Combined Search and Examination Report under Sections 17 and 18(3), UKIPO, Application No. GB1801659.2, dated Jul. 26, 2018.

Combined Search and Examination Report under Sections 17 and 18(3), UKIPO, Application No. GB1801661.8, dated Jul. 30, 2018.

(56) References Cited

OTHER PUBLICATIONS

Combined Search and Examination Report under Sections 17 and 18(3), UKIPO, Application No. GB1801684.2, dated Aug. 1, 2018.
Combined Search and Examination Report, UKIPO, Application No. GB1801874.7, dated Feb. 25, 2018.
Combined Search and Examination Report under Sections 17 and 18(3), UKIPO, Application No. GB18048419, dated Sep. 27, 2018.
International Search Report and Written Opinion of the International Searching Authority, International Application No. PCT/GB2018/052906, dated Jan. 14, 2019.
Villalba, Jesus et al., Preventing Replay Attacks on Speaker Verification Systems, International Carnahan Conference on Security Technology (ICCST), 2011 IEEE, Oct. 18, 2011, pp. 1-8.
Combined Search and Examination Report, UKIPO, Application No. GB1713697.9, dated Feb. 20, 2018.
Chen et al., "You Can Hear But You Cannot Steal: Defending Against Voice Impersonation Attacks on Smartphones", Proceedings of the International Conference on Distributed Computing Systems, PD: 20170605.
International Search Report and Written Opinion of the International Searching Authority, International Application No. PCT/GB2018/051765, dated Aug. 16, 2018.
International Search Report and Written Opinion of the International Searching Authority, International Application No. PCT/GB2019/050185, dated Apr. 2, 2019.
Combined Search and Examination Report under Sections 17 and 18(3), UKIPO, Application No. GB1803570.9, dated Aug. 21, 2018.
International Search Report and Written Opinion of the International Searching Authority, International Application No. PCT/GB2019/052302, dated Oct. 2, 2019.
Liu, Yuan et al., "Speaker verification with deep features", Jul. 2014, in International Joint Conference on Neural Networks (IJCNN), pp. 747-753, IEEE.
International Search Report and Written Opinion of the International Searching Authority, International Application No. PCT/GB2018/051927, dated Sep. 25, 2018.
Combined Search and Examination Report under Sections 17 and 18(3), UKIPO, Application No. 1801530.5, dated Jul. 25, 2018.
International Search Report and Written Opinion of the International Searching Authority, International Application No. PCT/GB2018/051924, dated Sep. 26, 2018.
Combined Search and Examination Report under Sections 17 and 18(3), UKIPO, Application No. 1801526.3, dated Jul. 25, 2018.
International Search Report and Written Opinion of the International Searching Authority, International Application No. PCT/GB2018/051931, dated Sep. 27, 2018.
Combined Search and Examination Report under Sections 17 and 18(3), UKIPO, Application No. 1801527.1, dated Jul. 25, 2018.
International Search Report and Written Opinion of the International Searching Authority, International Application No. PCT/GB2018/051925, dated Sep. 26, 2018.
Combined Search and Examination Report under Sections 17 and 18(3), UKIPO, Application No. 1801528.9, dated Jul. 25, 2018.
International Search Report and Written Opinion of the International Searching Authority, International Application No. PCT/GB2018/051928, dated Dec. 3, 2018.
Combined Search and Examination Report under Sections 17 and 18(3), UKIPO, Application No. 1801532.1, dated Jul. 25, 2018.
Lucas, Jim, What is Electromagnetic Radiation?, Mar. 13, 2015, Live Science, https://www.livescience.com/38169-electromagnetism.html, pp. 1-11 (Year: 2015).
Brownlee, Jason, A Gentle Introduction to Autocorrelation and Partial Autocorrelation, Feb. 6, 2017, https://machinelearningmastery.com/gentle-introduction-autocorrelation-partial-autocorrelation/, accessed Apr. 28, 2020.
Zhang et al., DolphinAttack: Inaudible Voice Commands, Retrieved from Proceedings of the 2017 ACM SIGSAC Conference on Computer and Communications Security, Aug. 2017.
Song, Liwei, and Prateek Mittal, Poster: Inaudible Voice Commands, Proceedings of the 2017 ACM SIGSAC Conference on Computer and Communications Security, Aug. 2017.
Fortuna, Andrea, [Online], DolphinAttack: inaudiable voice commands allow attackers to control Siri, Alexa and other digital assistants, Sep. 2017.
Ohtsuka, Takahiro and Kasuya, Hideki, Robust ARX Speech Analysis Method Taking Voice Source Pulse Train Into Account, Journal of the Acoustical Society of Japan, 58, 7, pp. 386-397, 2002.
Wikipedia, Voice (phonetics), https://en.wikipedia.org/wiki/Voice_(phonetics), accessed Jun. 1, 2020.
First Office Action, China National Intellectual Property Administration, Patent Application No. 2018800418983, dated May 29, 2020.
International Search Report and Written Opinion, International Application No. PCT/GB2020/050723, dated Jun. 16, 2020.
Liu, Yuxi et al., "Earprint: Transient Evoked Otoacoustic Emission for Biometrics", IEEE Transactions on Information Forensics and Security, IEEE, Piscataway, NJ, US, vol. 9, No. 12, Dec. 1, 2014, pp. 2291-2301.
Seha, Sherif Nagib Abbas et al., "Human recognition using transient auditory evoked potentials: a preliminary study", IET Biometrics, IEEE, Michael Faraday House, Six Hills Way, Stevenage, HERTS., UK, vol. 7, No. 3, May 1, 2018, pp. 242-250.
Liu, Yuxi et al., "Biometric identification based on Transient Evoked Otoacoustic Emission", IEEE International Symposium on Signal Processing and Information Technology, IEEE, Dec. 12, 2013, pp. 267-271.

\* cited by examiner

DETECTION OF REPLAY ATTACK

TECHNICAL FIELD

Embodiments described herein relate to methods and devices for detecting a replay attack on a voice biometrics system.

BACKGROUND

Voice biometrics systems are becoming widely used. In such a system, a user trains the system by providing samples of their speech during an enrollment phase. In subsequent use, the system is able to discriminate between the enrolled user and non-registered speakers. Voice biometrics systems can in principle be used to control access to a wide range of services and systems.

One way for a malicious party to attempt to defeat a voice biometrics system is to obtain a recording of the enrolled user's speech, and to play back the recording in an attempt to impersonate the enrolled user and to gain access to services that are intended to be restricted to the enrolled user.

This is referred to as a replay attack, or as a spoofing attack.

SUMMARY

According to an aspect of the present invention, there is provided a method of detecting a replay attack on a voice biometrics system, the method comprising: receiving a speech signal at at least a first microphone and a second microphone, wherein the speech signal has components at first and second frequencies; obtaining information about a position of a source of the first frequency component of the speech signal, relative to the first and second microphones; obtaining information about a position of a source of the second frequency component of the speech signal, relative to the first and second microphones; and comparing the position of the source of the first frequency component and the position of the source of the second frequency component. It is determined that the speech signal may result from a replay attack if the position of the source of the first frequency component differs from the position of the source of the second frequency component by more than a threshold amount.

According to a second aspect of the present invention, there is provided a system for detecting a replay attack in a speaker recognition system, the system being configured for performing the method of the first aspect.

According to an aspect of the present invention, there is provided a device comprising a system according to the second aspect. The device may comprise a mobile telephone, an audio player, a video player, a mobile computing platform, a games device, a remote controller device, a toy, a machine, or a home automation controller or a domestic appliance.

According to an aspect of the present invention, there is provided a computer program product, comprising a computer-readable tangible medium, and instructions for performing a method according to the first aspect.

According to an aspect of the present invention, there is provided a non-transitory computer readable storage medium having computer-executable instructions stored thereon that, when executed by processor circuitry, cause the processor circuitry to perform a method according to the first aspect.

According to an aspect of the present invention, there is provided a device comprising the non-transitory computer readable storage medium according to the previous aspect. The device may comprise a mobile telephone, an audio player, a video player, a mobile computing platform, a games device, a remote controller device, a toy, a machine, or a home automation controller or a domestic appliance.

BRIEF DESCRIPTION OF DRAWINGS

For a better understanding of the present invention, and to show how it may be put into effect, reference will now be made to the accompanying drawings, in which.

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
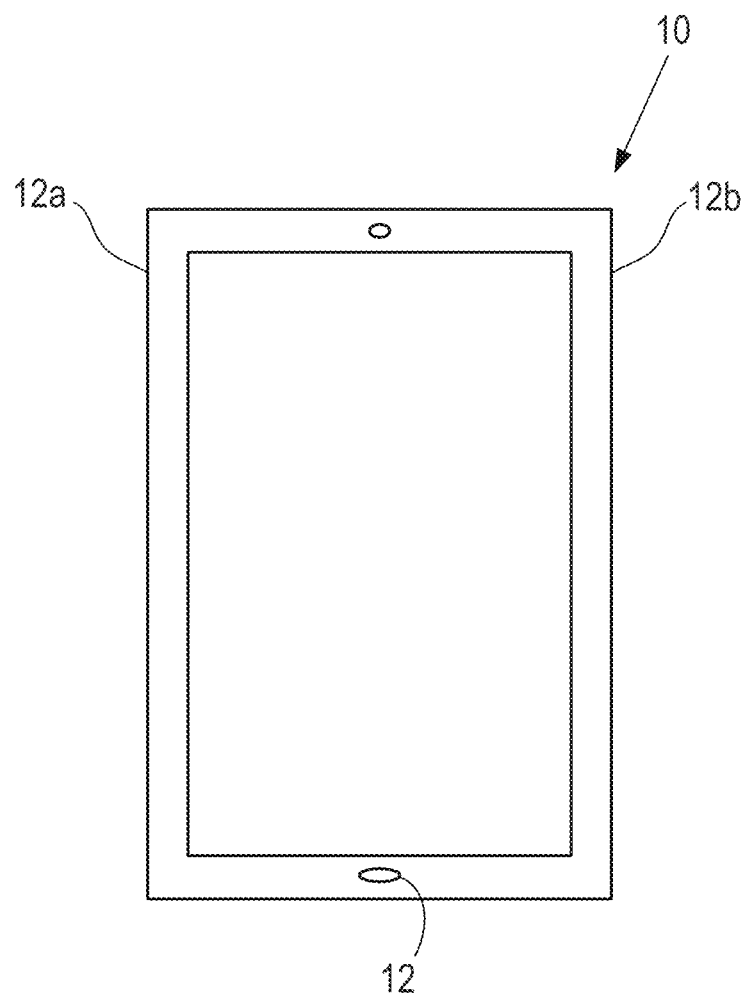
FIG. 1 illustrates a smartphone.

FIG. 1 illustrates a smartphone 10, having microphones 12, 12a, and 12b for detecting ambient sounds. In this example, the microphone 12 is of course used for detecting the speech of a user who is holding the smartphone 10, while the microphones 12a, 12b are provided on the upper part of the sides of the smartphone 10, and are therefore not clearly visible in FIG. 1.

Figure 2:
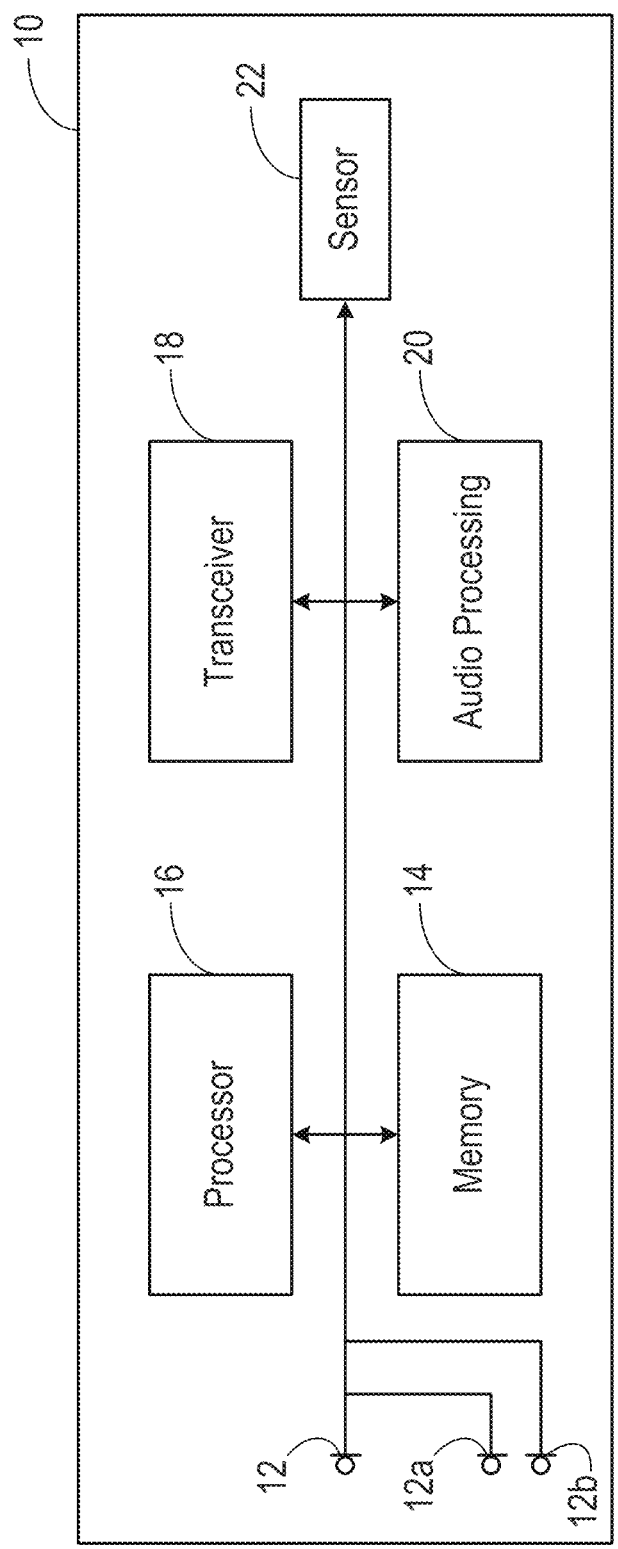
FIG. 2 is a schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12a, 12b, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

FIG. 2 also shows at least one sensor 22. In embodiments of the present invention, the sensor is a magnetic field sensor for detecting a magnetic field. For example, the sensor 22 may be a Hall effect sensor, that is able to provide separate measurements of the magnet field strength in three orthogonal directions. Further examples of sensors which may be used may comprise gyro sensors, accelerometers, or software-based sensors operable to determine phone orientation, wherein such software-based sensors may operate in combination with software programs such as such as the FaceTime™ system provided by Apple, Inc.

In this embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device. In other embodiments, the speech recognition system is also provided on the smartphone 10.

One attempt to deceive a voice biometric system is to play a recording of an enrolled user's voice in a so-called replay or spoof attack.

Figure 3:
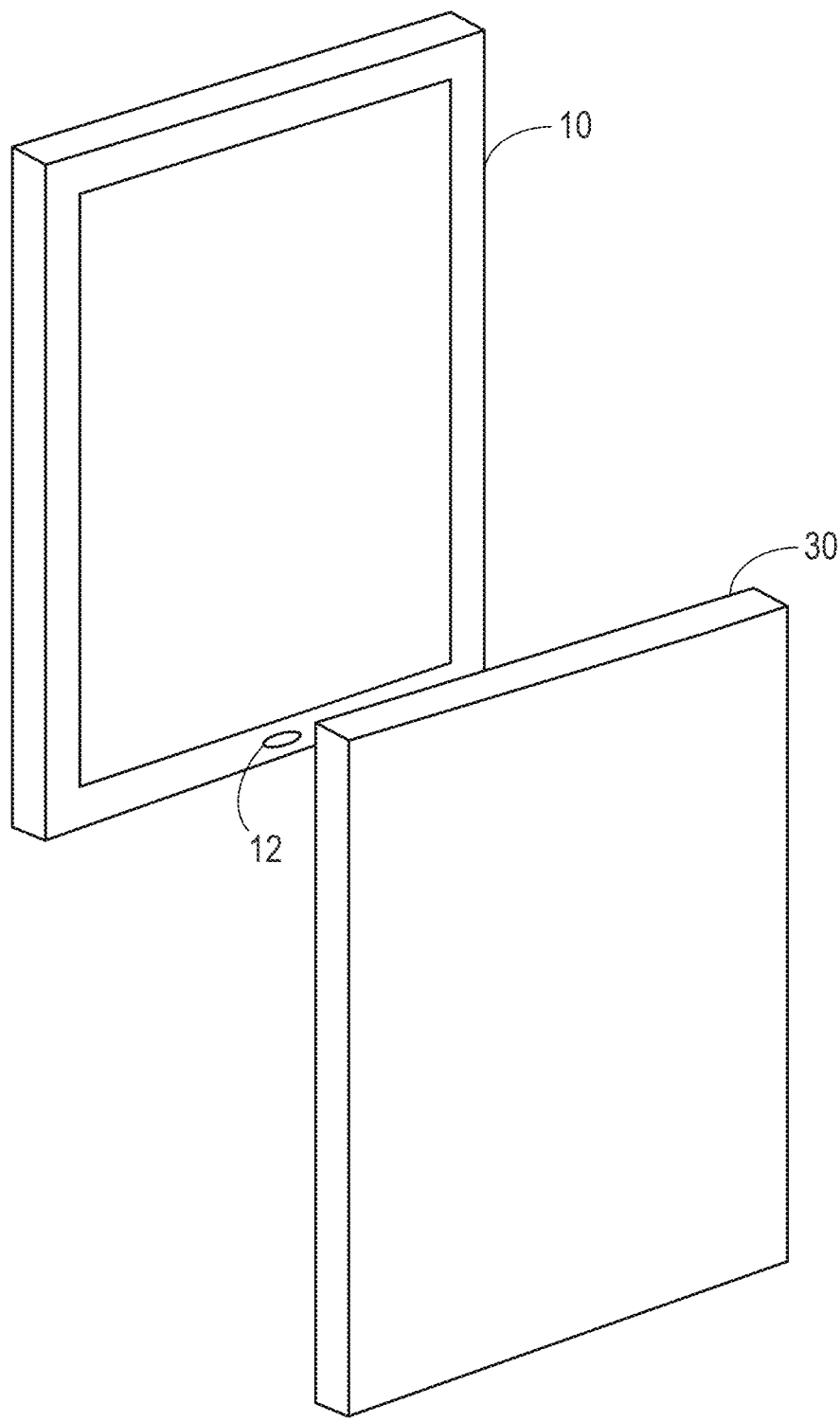
FIG. 3 illustrates a first situation in which a replay attack is being performed.

FIG. 3 shows an example of a situation in which a replay attack is being performed. Thus, in FIG. 3, the smartphone 10 is provided with voice biometric functionality. In this example, the smartphone 10 is in the possession, at least temporarily, of an attacker, who has another smartphone 30. The smartphone 30 has been used to record the voice of the enrolled user of the smartphone 10. The smartphone 30 is brought close to the microphone inlet 12 of the smartphone 10, and the recording of the enrolled user's voice is played back. If the voice biometric system is unable to detect that the enrolled user's voice that it detects is a recording, the attacker will gain access to one or more services that are intended to be accessible only by the enrolled user.

It is known that smartphones, such as the smartphone 30, are typically provided with loudspeakers that are of relatively low quality due to size constraints. Thus, the recording of an enrolled user's voice played back through such a loudspeaker will not be a perfect match with the user's voice, and this fact can be used to identify replay attacks. For example, loudspeakers may have certain frequency characteristics, and if these frequency characteristics can be detected in a speech signal that is received by the voice biometrics system, it may be considered that the speech signal has resulted from a replay attack.

Figure 4:
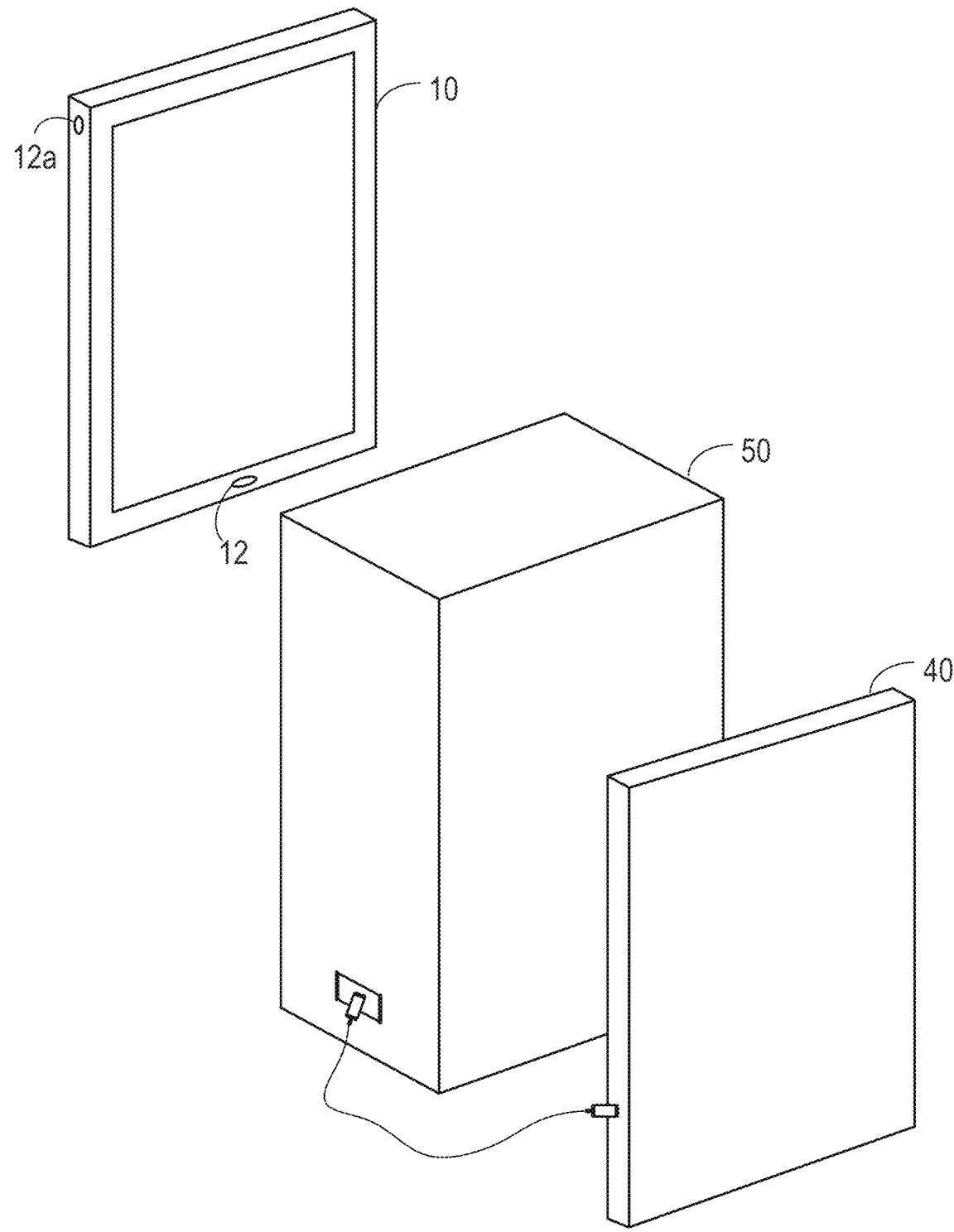
FIG. 4 illustrates a second situation in which a replay attack is being performed.

FIG. 4 shows a second example of a situation in which a replay attack is being performed, in an attempt to overcome the method of detection described above. Thus, in FIG. 4, the smartphone 10 is provided with voice biometric functionality. Again, in this example, the smartphone 10 is in the possession, at least temporarily, of an attacker, who has another smartphone 40. The smartphone 40 has been used to record the voice of the enrolled user of the smartphone 10.

In this example, the smartphone 40 is connected to a high quality loudspeaker 50. Then, the smartphone 10 is positioned close to the loudspeaker 50, and the recording of the enrolled user's voice is played back through the loudspeaker 50. As before, if the voice biometric system is unable to detect that the enrolled user's voice that it detects is a recording, the attacker will gain access to one or more services that are intended to be accessible only by the enrolled user.

In this example, the loudspeaker 50 may be of high enough quality that the recording of the enrolled user's voice played back through the loudspeaker will not be reliably distinguishable from the user's voice, and so the audio features of the speech signal cannot be used to identify the replay attack.

However, it is appreciated that many loudspeakers, and particularly high quality loudspeakers, are electromagnetic loudspeakers in which an electrical audio signal is applied to one or both of two voice coils, which are located between the poles of permanent magnets, causing the coil or coils to move rapidly backwards and forwards. This movement of a coil causes a respective diaphragm attached to the coil to move backwards and forwards, creating sound waves.

Figure 5:
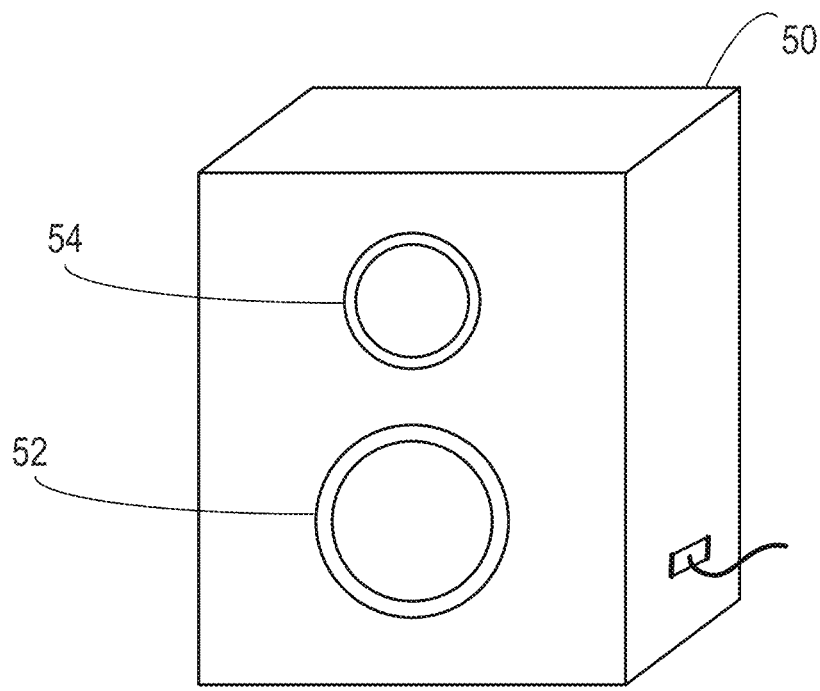
FIG. 5 shows a part of FIG. 4 in more detail.

FIG. 5 illustrates the general form of one such loudspeaker device 50 that is in widespread use. Specifically, the illustrated loudspeaker device 50 has two loudspeakers, with respective voice coils and diaphragms, as described above. The first of these loudspeakers is a woofer 52, which is intended to play back relatively low frequency sounds, for example at frequencies up to 1 kHz, or at frequencies up to 2 kHz. The second of the loudspeakers is a tweeter 54, which is intended to play back relatively high frequency sounds, for example at frequencies from 2 kHz up to at least the top of the audio frequency range at 20 kHz.

It is noted that there also exist loudspeaker devices that include more than two loudspeakers, which are intended to play back different frequencies. The method described herein can be used to identify replay attacks that use those loudspeaker devices too.

Figure 6:
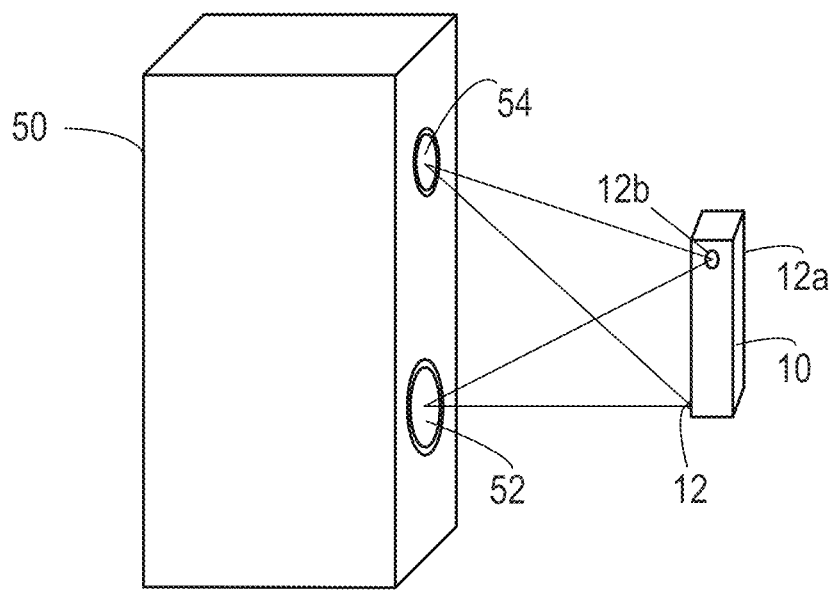
FIG. 6 illustrates sound transmission in the arrangement of FIG. 5.

FIG. 6 shows a typical arrangement, in which the loudspeaker device 50 is being used to replay speech that is detected by the smartphone 10. Thus, FIG. 6 shows sounds from the woofer 52 reaching the microphone 12 that is located at the bottom end of the smartphone 10, and also reaching the microphones 12a and 12b that are located at the top end of the smartphone 10. FIG. 6 also shows sounds from the tweeter 54 reaching the microphone 12 that is located at the bottom end of the smartphone 10, and also reaching the microphones 12a and 12b that are located at the top end of the smartphone 10.

It can therefore be seen from FIG. 6 that, as seen from the smartphone 10, the position of the source of the low frequency sounds from the woofer 52 is different from the position of the source of the high frequency sounds from the tweeter 54.

The appreciation of this fact is used in the method described herein.

Figure 7:
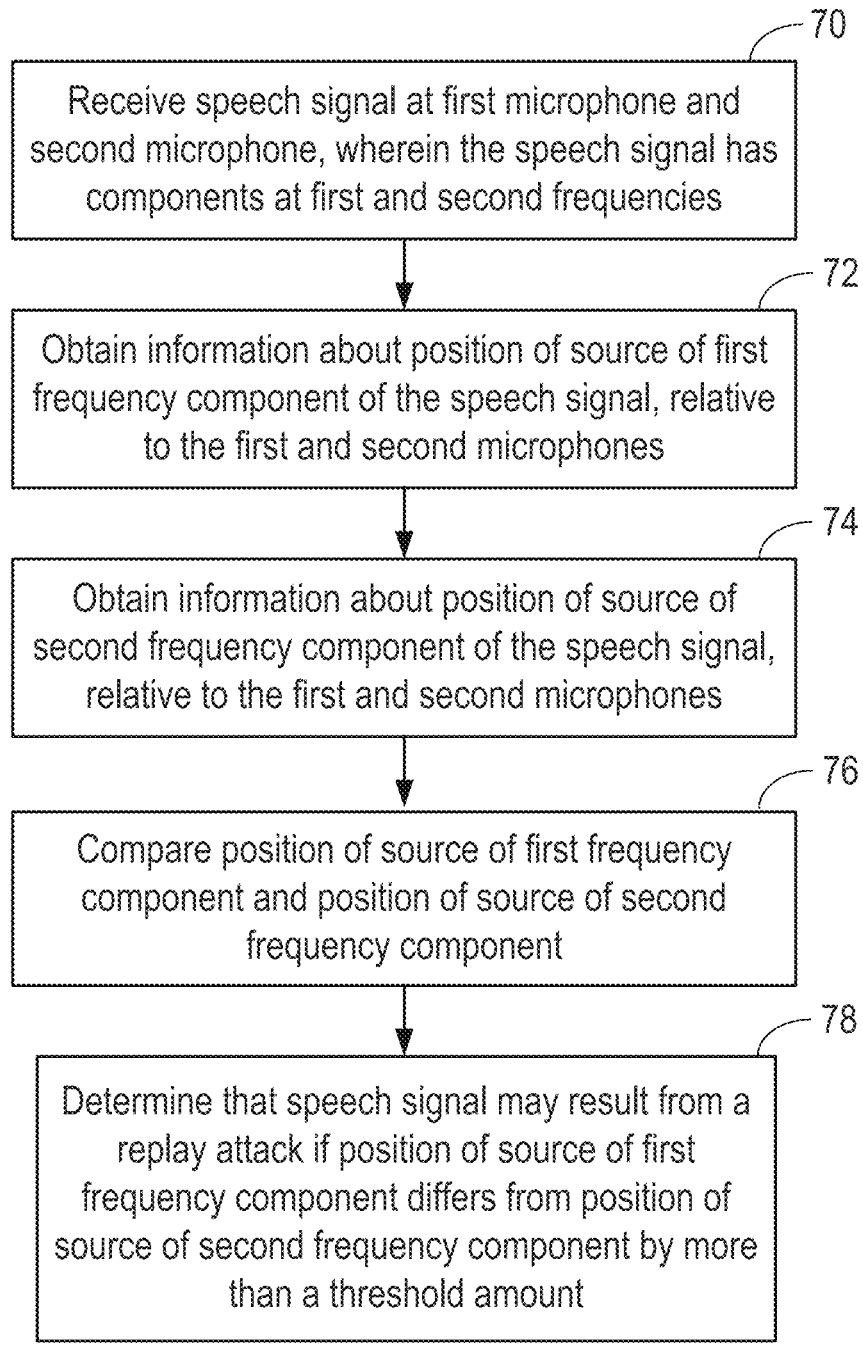
FIG. 7 is a flow chart illustrating a method.
Figure 8:
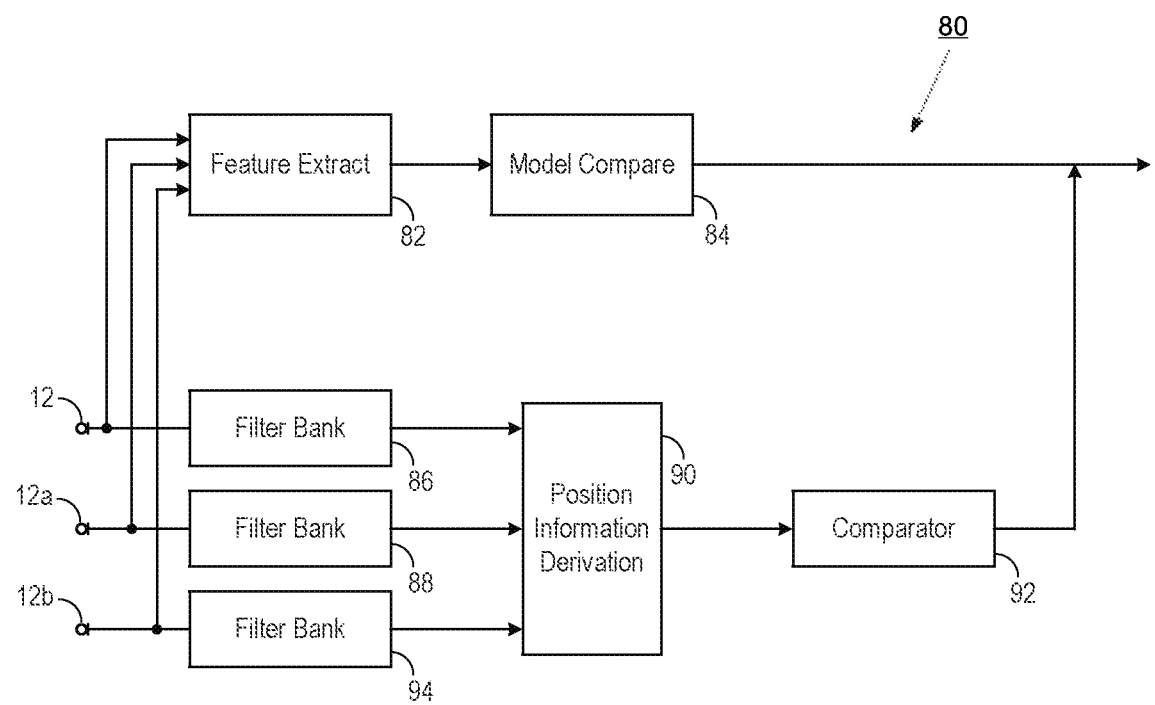
FIG. 8 is a block diagram illustrating a system for performing the method of FIG. 7.

FIG. 7 is a flow chart, illustrating a method of detecting a replay attack on a voice biometrics system, and FIG. 8 is a block diagram illustrating functional blocks in the voice biometrics system.

Thus, FIG. 8 shows a voice biometrics system 80, in which audio signals generated by one or more of the microphones 12, 12a, 12b in response to detected ambient sounds are passed to a feature extraction block 82, in order to obtain features of the speech that is detected in the signals.

The extracted features are passed to a model compare block 84, in which the extracted features are compared with the features of one or more model of the speech of an enrolled user. For example, there may be only one enrolled user of a voice biometrics system associated with one particular device 10. Then, the extracted features of the detected speech are compared with the model of that user's speech, in order to decide whether the detected speech should be considered to be the speech of the enrolled user.

In step 70 in the method of FIG. 7, speech signals are received from at least a first microphone 12 and a second microphone 12a. In practice, signals generated by the microphones 12, 12a may be passed to a voice activity detector, and only those segments of the signals that contain speech may be processed further.

The speech signal generated by the microphone 12 is passed to a first filter bank 86, and the speech signal generated by the microphone 12a is passed to a second filter bank 88. The filter banks 86, 88 extract components of the speech signals at at least first and second frequencies.

For example, the filter banks 86, 88 may extract components in a first relatively narrow frequency band and in a second relatively narrow frequency band. In this case, the two frequency bands may have bandwidths of, say 10-200 Hz. The first frequency band may be centred on a frequency in the range of 100 Hz-1 kHz, for example at 200 Hz. The second frequency band may be centred on a frequency in the range of 2 kHz-15 kHz, for example at 5 kHz.

Alternatively, the filter banks 86, 88 may extract components in a first relatively wide frequency band and in a second relatively wide frequency band. In this case, the two frequency bands may have bandwidths of, say 200 Hz-2 kHz. Again, the first frequency band may be centred on a frequency in the range of 100 Hz-1 kHz, for example at 200 Hz. The second frequency band may be centred on a frequency in the range of 2 kHz-15 kHz, for example at 5 kHz.

In other embodiments, more than two frequency components are extracted. For example, up to 10 frequency components or more could be extracted. The filter bank may be implemented as a Fast Fourier Transform (FFT) block.

In step 72 of the process shown in FIG. 7, the extracted frequency components are passed to a position information derivation block 90. The position information derivation block 90 obtains information about a position of a source of the first frequency component of the speech signal, relative to the first and second microphones.

In step 74 of the process shown in FIG. 7, the position information derivation block 90 obtains information about a position of a source of the second frequency component of the speech signal, relative to the first and second microphones.

In one embodiment, the position information derivation block 90 obtains information about the positions of the sources of the frequency components by determining an angle of arrival of each frequency component at the first and second microphones.

In general, correlation methods will be used to determine the time difference between two signals. In a preferred embodiment, a method known as generalised cross-correlation using phase transform (GCC-PHAT) can be used to estimate the time delay for an arbitrary waveform. In this case GCC-PHAT would be applied to the different frequency bands to measure the relative delay. These delays can then be transformed into an angle of arrival that provides information about the position of the source of the signal in that frequency band. Beamformers may be used.

The method for determining the positions of the sources of the respective frequency components is described in more detail below.

As can be seen from FIG. 6, sounds emanating from the woofer 52 will have a shorter path to the microphone 12 than to the microphone 12a, and so they will arrive at the microphone 12 before they arrive at the microphone 12a. This time difference can be used to provide some information about the position of the source of any component of the speech signal that is being produced by the woofer 52.

Conversely, sounds emanating from the tweeter 54 will have a shorter path to the microphone 12a than to the microphone 12a, and so they will arrive at the microphone 12a before they arrive at the microphone 12. This time difference can be used to provide some information about the position of the source of any component of the speech signal that is being produced by the tweeter 54.

For example, in each case, the respective time difference can be determined by calculating a cross-correlation between the signals received at the two microphones 12, 12a. The peak in the cross-correlation value will indicate the difference in the time of arrival of the relevant frequency component at the two microphones.

It should be noted that, although in this illustrated example the device 10 is positioned so that the sounds emanating from the woofer 52 will have a shorter path to the microphone 12 than to the microphone 12a, and sounds emanating from the tweeter 54 will have a shorter path to the microphone 12a than to the microphone 12a, the method described herein does not rely on any assumption about the position of the device 10 relative to the speaker device 50. For most positions of the device, the time difference between the signals from the woofer 52 arriving at the two microphones 12, 12a will be different from the time difference between the signals from the tweeter 54 arriving at the two microphones 12, 12a.

Figure 9:
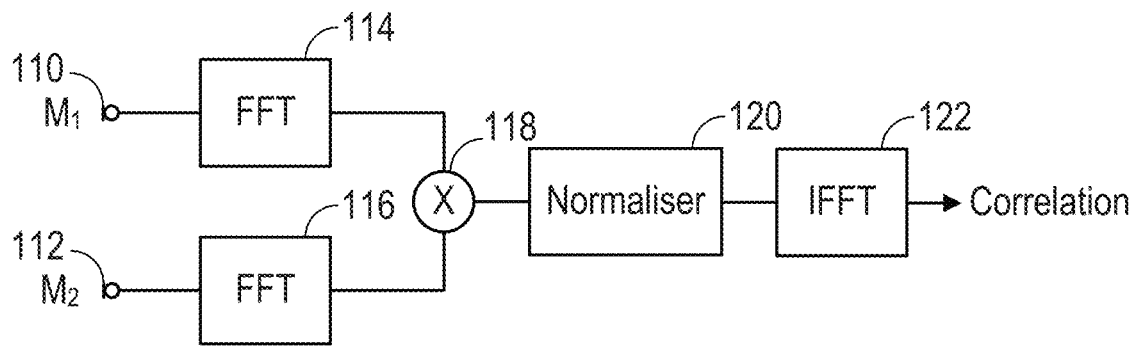
FIG. 9 illustrates a stage in the method of FIG. 7.

FIG. 9 illustrates the form of the processing to determine the cross-correlation for one frequency component. Specifically, FIG. 9 shows the form of the processing to perform a Generalised Cross Correlation with PHAse Transform (GCC-PHAT). This combines the computational efficiency of a transform-domain processing with a spectral whitening state to calculate the correlation function with the narrowest lobe.

Signals from two microphones 110, 112 are passed to respective Fast Fourier Transform (FFT) blocks 114, 116. In the embodiments described above, where the locations of the sources of different frequency components are determined, the signals that are passed to the FFT blocks 114, 116 are the relevant frequency components of the signals generated by the microphones 110, 112.

The outputs of the FFT blocks 114, 116 are passed to a correlation block 118. The output of the correlation block 118 is passed to a normaliser 120, and the result of the normalisation is passed to an Inverse Fast Fourier Transform (IFFT) block 122 to give the correlation result.

Thus, the output of the IFFT block 122 is the cross-correlation result for one frequency component, between the signals generated by the first and second microphones in response to that frequency component. The signals received by the two microphones will typically be the same, but with an offset that depends on the time difference of arrival of the signal at the two microphones.

Figure 10:
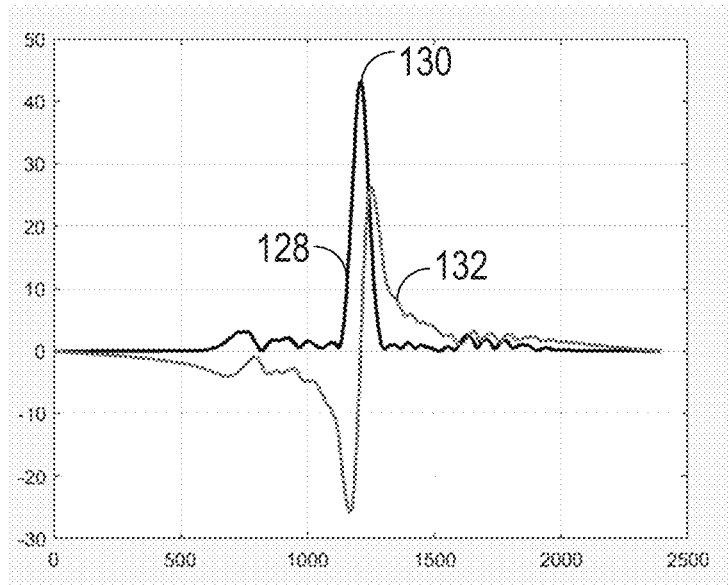
FIG. 10 illustrates a stage in the method of FIG. 7.

FIG. 10 shows the general form of the cross-correlation 128. The peak 130 of the cross-correlation 128 occurs at a sample offset value that corresponds to a specific time difference of arrival. However, obtaining this directly from the cross-correlation 128 only allows a result to be obtained with a maximum accuracy that is limited by the step size of the sample rate used by the correlator, and this can result in relatively large errors.

The accuracy of the determination can be improved by interpolating the cross-correlation 128 to determine the position of the peak 130. One method that can be used for this is to apply a parabolic interpolator on the peak of the correlation waveform. That is, a point close to the peak 130 is chosen, and then one point on either side of that first point is also chosen. A parabolic interpretation is performed in order to find the actual position of the peak.

To perform a parabolic interpolation, a second order polynomial interpolation is performed on the smoothed power spectrum, using 3 points: the left and right crossing of the selected data with 0.8 (frequencies $f_{left}$ and $f_{right}$), and the central frequency $f_{meas}$. Hence:

$$\begin{bmatrix} p_2 \\ p_1 \\ p_0 \end{bmatrix} = \begin{bmatrix} f_{left}^2 & f_{left} & 1 \\ f_{meas}^2 & f_{meas} & 1 \\ f_{right}^2 & f_{right} & 1 \end{bmatrix}^{-1} \begin{bmatrix} A_{sel}(f_{left}) \\ A_{sel}(f_{meas}) \\ A_{sel}(f_{right}) \end{bmatrix},$$

where $p_2$, $p_1$, and $p_0$ are the coefficients of the polynomial, and ($A_{sel}(f_{left})$, $f_{left}$); ($A_{sel}(f_{meas})$, $f_{meas}$); and ($A_{sel}(f_{right})$, $f_{right}$) are the three chosen points.

Hence we solve:

$$p_2 f^2 + p_1 f + p_0 - \frac{A_{sel}(F_{meas})}{\sqrt{2}} = 0$$

This equation can then be solved to obtain the value of f at which the peak value occurs, and this can be converted back to a time difference.

An alternative, and possibly more robust, method for finding the location of the peak 130, and hence the time difference of arrival between the signals received at the two microphones, is to use the Hilbert transform to shift the phase of the waveform. The imaginary part of the Hilbert transformed waveform is shown by the reference numeral 132 in FIG. 10. The peak 130 of the waveform 128 now corresponds to the point at which the waveform 132 crosses the zero line, and this can be found by using a zero cross based interpolation. This is now a subsample method and limited to the accuracy of the sample rate.

Thus, for this particular frequency component of the received sound, it is possible to find the time difference of arrival of the sound at the two microphones.

Figure 11:
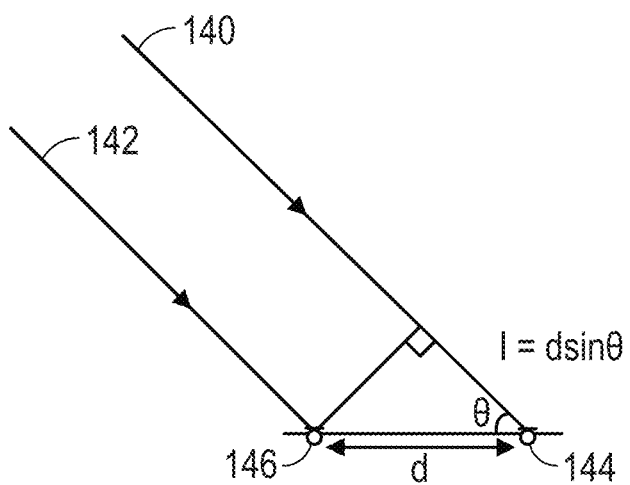
FIG. 11 illustrates a stage in the method of FIG. 7.

FIG. 11 shows the situation where the source of the sound is in the far field. That is, the source is far enough from the microphones that the respective paths 140, 142 from the source to the two microphones 144, 146 can be considered parallel. In FIG. 11, d is the distance between the microphones 144, 146, and θ is the angle of approach of the paths 140, 142 from the source to the microphones 144, 146. By geometry, the extra distance l travelled by the path to the microphone 144, compared to the path to the microphone 146, is given by l=d.sin θ.

The time Δt taken to travel this extra distance can then be found by using the equation l=c.Δt, where c is the speed of sound.

Thus, the angle of approach θ can be found by θ=sin⁻¹ (c.Δt/d).

The actual calculation of the time difference of arrival of the sound at the two microphones is subject to noise, and thus there can be some uncertainty in the result obtained above. One possibility is that a measurement that is corrupted by noise could lead to a physically impossible result that l is greater than d. In order to prevent such measurements being used, it is possible to check that the magnitude of (c.Δt/d) is less than unity, before proceeding to attempt to calculate the value of θ.

This example assumes that two microphones are used. If more than two microphones are used, then the same method can be used for the different pairs of microphones, allowing the location of the source of that frequency component of the sound to be determined by triangulation.

Figure 12:
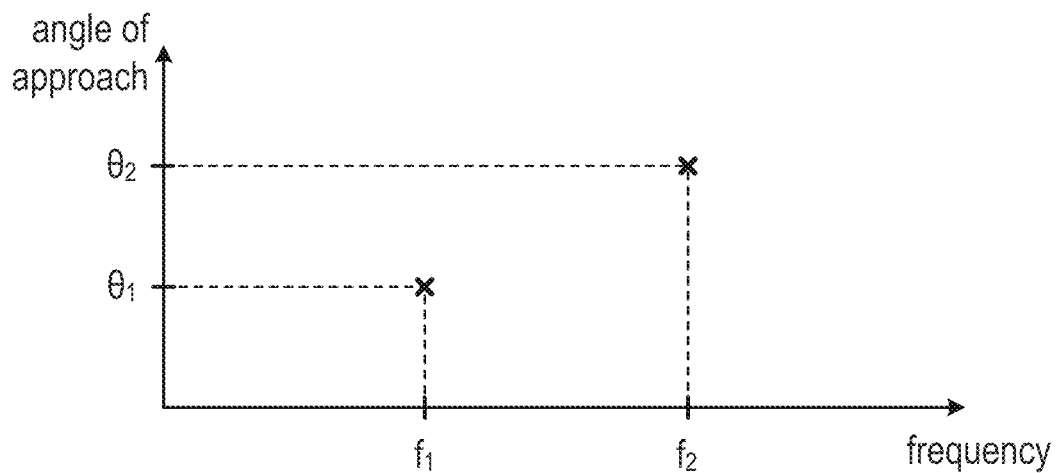
FIG. 12 illustrates a result of performing a method of FIG. 7.

FIG. 12 illustrates the results obtained for an example in which the received input signal is divided into two frequency components. Specifically, FIG. 12 shows an angle of approach $\theta_1$ at a frequency $f_1$ and an angle of approach $\theta_2$ at a frequency $f_2$.

Thus, the time difference between the times of arrival at the two microphones gives some information about the position of the source of the first frequency component and the position of the source of the second frequency component, although in this embodiment that information does not precisely indicate the positions of the sources.

In step 76 of the method shown in FIG. 7, the position information is passed to a comparator block 92, for comparing the position of the source of the first frequency component and the position of the source of the second frequency component.

Specifically, it is determined if the position of the source of the first frequency component differs from the position of the source of the second frequency component by more than a threshold amount. In the illustrated embodiment described above, where precise position information is not available, it may be determined that the position of the source of the first frequency component differs from the position of the source of the second frequency component by more than the threshold amount if the difference between the angles of approach $\theta_1$ and $\theta_2$ exceeds a threshold amount.

If it is determined that the position of the source of the first frequency component differs from the position of the source of the second frequency component by more than the threshold amount, then it is determined that the speech signal may have been generated by a loudspeaker, and hence may result from a replay attack.

In this case, the operation of the voice biometrics system is adapted. For example, as shown in FIG. 8, the output from the model compare block 84 may be accompanied by some information about the possibility that the input signal may result from a replay attack. This information can then be taken into consideration when deciding whether to treat the received speech signal as coming from the enrolled user and to act on it.

In other embodiments, if it is determined that the speech signal may result from a replay attack, the operation of the model compare block 84 may be adapted or even prevented.

The embodiment described so far filters two frequency components of the received speech signal, and obtains information about the positions of the sources of those two components. As mentioned above, more than two frequency components may be filtered from the received speech signal. In that case, the result that would be characteristic of a signal generated by a loudspeaker device including a woofer and a tweeter would be that all of the low frequency components are found to come from one source location, and all high frequency components are found to come from a different source location.

Figure 13:
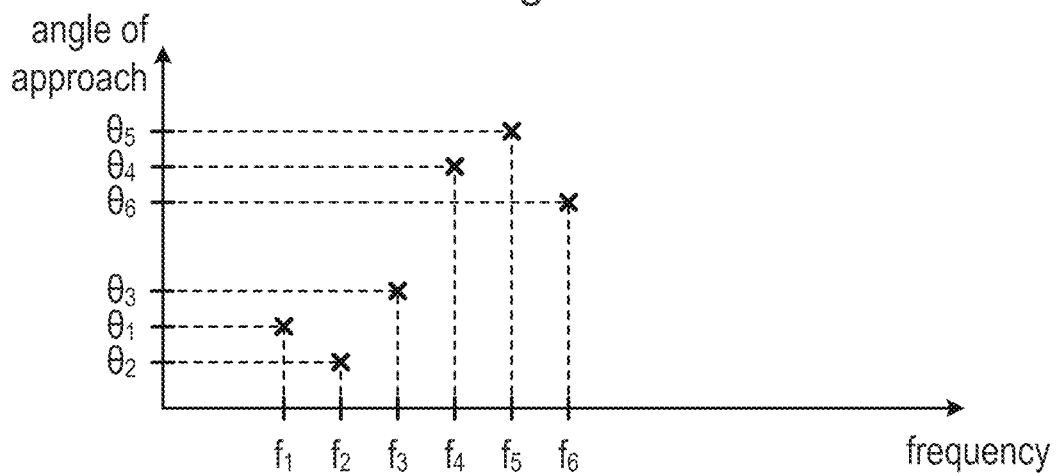
FIG. 13 illustrates a further result of performing a method of FIG. 7.

FIG. 13 illustrates this, in the case where the position information relates to the angle of approach of a frequency component of the received input signal. In this example, six frequency components have been extracted, with angles of approach $\theta_1$-$\theta_6$ corresponding to frequencies $f_1$-$f_6$, respectively. These results, with all of the angles of approach $\theta_1$-$\theta_3$ being clustered together, and being much smaller than the angles of approach $\theta_4$-$\theta_6$, indicate that the components at frequencies $f_1$-$f_3$ are coming from a different source to the components at frequencies $f_4$-$f_6$. In a case such as this, the results for frequencies $f_1$-$f_3$ can be formed into one cluster and averaged, and the results for the frequencies $f_4$-$f_6$ can be formed into another cluster and averaged, and the average result for frequencies $f_1$-$f_3$ can be compared with the average result for the frequencies $f_4$-$f_6$. The average angles of approach can be considered to give information about the positions of the sources of a first frequency component and a second frequency component, and it can then be determined that the speech signal may result from a replay attack if the position of the source of the first frequency component differs from the position of the source of the second frequency component by more than a threshold amount. Alternatively, the largest value $\theta_5$ of the angle of approach can be compared with the smallest value $\theta_2$ of the angle of approach and it can then be determined that the speech signal may result from a replay attack if the position of the source of the frequency component with the largest value $\theta_5$ of the angle of approach differs from the position of the source of the frequency component with the smallest value $\theta_2$ of the angle of approach by more than a threshold amount. In another example, the second largest value $\theta_4$ of the angle of approach can be compared with the second smallest value $\theta_1$ of the angle of approach and it can then be determined that the speech signal may result from a replay attack if the position of the source of the frequency component with the second largest value $\theta_4$ of the angle of approach differs from the position of the source of the frequency component with the second smallest value $\theta_1$ of the angle of approach by more than a threshold amount.

Similarly, a result that would be characteristic of a signal generated by a loudspeaker device including three loudspeakers would be that one or more low frequency components are found to come from one source location, one or more mid-frequency components are found to come from a second source location, and one or more high frequency components are found to come from a third source location.

Generally, information is obtained about the respective positions of the sources of more than two frequency components of the speech signal, relative to the first and second microphones. The positions of the source of the frequency components are compared, and it is determined that the speech signal may result from a replay attack if the position of the source of one frequency component differs from the position of the source of at least one other frequency component by more than a threshold amount.

In the examples given above, signals from only two microphones 12, 12*a* are used.

In other embodiments, signals from more than two microphones are used. For example, if signals from three microphones 12, 12*a*, 12*b* are all used, with the signal from the microphone 12*b* being passed to a filter bank 94 and the resulting components also being passed to the position information derivation block 90, then more precise position information can be obtained. In principle, with signals being received from three (or more) microphones, the exact location of the source of each component can be derived using triangulation.

In that case, the separation of the source locations can be compared with a threshold value that is related to the size of a human mouth (on the basis that a separation that exceeds the size of a human mouth indicates that the speech does not come from a human speaker), and/or with a threshold that is related to the size of a typical loudspeaker device (on the basis that a separation that corresponds to the size of a typical loudspeaker device indicates that the speech may well come from such a loudspeaker device).

In a still further embodiment, the method proceeds as described above, using signals from two microphones. However, if the apparent positions of the source of the first frequency component and of the source of the second frequency component are such that the comparator block 92 is unable to reach a conclusion as to whether the speech signal may result from a replay attack, then the signal from a third microphone may also be taken into account. That is, the signal from the third microphone is passed to a respective filter bank, in order to extract the relevant frequency components, and then, for each frequency component, the signals from the three microphones are examined in order to obtain more precise location information.

This more precise location information for each frequency component can then be used to determine whether the different frequency components are coming from different source locations, and hence whether the speech signal may result from a replay attack.

There are therefore disclosed methods and systems that can be used for detecting a possible replay attack.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of detecting a replay attack on a voice biometrics system, the method comprising:
   receiving a speech signal at at least a first microphone and a second microphone, wherein the speech signal has components at first and second frequencies;
   obtaining information about a position of a source of the first frequency component of the speech signal, relative to the first and second microphones;
   obtaining information about a position of a source of the second frequency component of the speech signal, relative to the first and second microphones;
   comparing the position of the source of the first frequency component and the position of the source of the second frequency component; and
   determining that the speech signal results from a replay attack if the position of the source of the first frequency component differs from the position of the source of the second frequency component by more than a threshold amount.

2. A method according to claim 1, wherein obtaining information about the position of the source of the first frequency component of the speech signal, relative to the first and second microphones, comprises:
   filtering the received speech signal to obtain the first frequency component; and
   determining an angle of arrival of the first frequency component at the first and second microphones,
   and wherein obtaining information about the position of the source of the second frequency component of the speech signal, relative to the first and second microphones, comprises:
   filtering the received speech signal to obtain the second frequency component; and
   determining an angle of arrival of the second frequency component at the first and second microphones.

3. A method according to claim 2, wherein determining the angle of arrival of each frequency component at the first and second microphones comprises:
   calculating a cross-correlation between the respective component of the speech signal received at the first microphone and said respective component of the speech signal received at the second microphone; and
   obtaining information about the angle of arrival from a location of a peak in the calculated cross-correlation.

4. A method according to claim 1, wherein obtaining information about the position of the source of the first frequency component of the speech signal, relative to the first and second microphones, comprises:
   filtering the received speech signal to obtain the first frequency component; and
   determining a time difference between arrival of the first frequency component at the first and second microphones,
   and wherein obtaining information about the position of the source of the second frequency component of the speech signal, relative to the first and second microphones, comprises:
   filtering the received speech signal to obtain the second frequency component; and
   determining a time difference between arrival of the second frequency component at the first and second microphones.

5. A method according to claim 1, wherein the first frequency component comprises frequencies in the range of below 1 kHz.

6. A method according to claim 5, wherein the first frequency component comprises frequencies in the range of 100 Hz-1 kHz.

7. A method according to claim 1, wherein the second frequency component comprises frequencies in the range of above 1 kHz.

8. A method according to claim 7, wherein the second frequency component comprises frequencies in the range of 2 kHz-15 kHz.

9. A method according to claim 1, comprising:
   obtaining information about respective positions of sources of more than two frequency components of the speech signal, relative to the first and second microphones;
   comparing the positions of the source of the frequency components; and
   determining that the speech signal may result from a replay attack if the position of the source of one frequency component differs from the position of the source of at least one other frequency component by more than a threshold amount.

10. A method according to claim 1, further comprising:
    after comparing the position of the source of the first frequency component and the position of the source of the second frequency component, if the result of the comparing is indeterminate:
    receiving the speech signal at a third microphone;

obtaining additional information about the position of the source of the first frequency component of the speech signal, relative to the first, second and third microphones;

obtaining additional information about the position of the source of the second frequency component of the speech signal, relative to the first, second and third microphones; and comparing the position of the source of the first frequency component and the position of the source of the second frequency component based on said additional information.

11. A system for detecting a replay attack in a speaker recognition system, the system comprising an input for receiving a speech signal from at least a first microphone and a second microphone, and comprising a processor, and being configured for:

receiving a speech signal at at least a first microphone and a second microphone, wherein the speech signal has components at first and second frequencies;

obtaining information about a position of a source of the first frequency component of the speech signal, relative to the first and second microphones;

obtaining information about a position of a source of the second frequency component of the speech signal, relative to the first and second microphones;

comparing the position of the source of the first frequency component and the position of the source of the second frequency component; and determining that the speech signal results from a replay attack if the position of the source of the first frequency component differs from the position of the source of the second frequency component by more than a threshold amount.

12. A non-transitory computer readable storage medium having computer-executable instructions stored thereon that, when executed by processor circuitry, cause the processor circuitry to perform a method according to claim 1.

* * * * *